US012801163B2

(12) United States Patent
Sarkar et al.

(10) Patent No.: US 12,801,163 B2
(45) Date of Patent: Nov. 17, 2026

(54) SYSTEM AND METHOD FOR PROVIDING ROBOT-BASED ESCORTING SERVICE

(71) Applicant: Tata Consultancy Services Limited, Mumbai (IN)

(72) Inventors: Chayan Sarkar, New Delhi (IN); Avik Mitra, Bangalore (IN); Siddhartha Mondal, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 10 days.

(21) Appl. No.: 19/254,284

(22) Filed: Jun. 30, 2025

(65) Prior Publication Data

US 2026/0003369 A1 Jan. 1, 2026

(30) Foreign Application Priority Data

Jul. 1, 2024 (IN) ............................ 202421050378

(51) Int. Cl.
*G05D 1/686* (2024.01)
*G06T 7/20* (2017.01)
(Continued)

(52) U.S. Cl.
CPC ............... *G05D 1/686* (2024.01); *G06T 7/20* (2013.01); *G06T 7/50* (2017.01); *G06V 10/25* (2022.01);
(Continued)

(58) Field of Classification Search
None
See application file for complete search history.

(56) References Cited

U.S. PATENT DOCUMENTS 9,817,395 B2 11/2017 Sisbot et al.
12,181,880 B2 * 12/2024 Banerjee ............. B25J 11/0005
(Continued)

FOREIGN PATENT DOCUMENTS

CN 114347024 A * 4/2022 ............ B25J 9/1664
CN 114815851 A * 7/2022 ........... G05D 1/0276

OTHER PUBLICATIONS

Rollo et al., FollowMe: a Robust Person Following Framework Based on Visual Re-Identification and Gestures, Jul. 25, 2023, IEEE, pp. 1-6 (Year: 2023).*
(Continued)

*Primary Examiner* — Justin S Lee
(74) *Attorney, Agent, or Firm* — Finnegan, Henderson, Farabow, Garrett & Dunner, LLP

(57) ABSTRACT

Conventional robotic systems often fail to provide effective escorting services as they lack awareness of human motion dynamics. Present disclosure provides method and system for providing robot-based escorting service. The system tracks a user utilizing the robot-based escort service using a human re-identification technique and a human movement tracking technique. The human re-identification technique ensures that the same user is identified every time in crowded spaces and human movement tracking technique predicts a user state at intervals indicating whether user is following, lagging, or stopping based on re-identification performed by the human re-identification technique. Thereafter, the system adjust a speed of the robot in case it is determined that the user is either lagging or stopping, thereby enabling the robot to adapt its speed according to user's movements which further helps in providing seamless experience to user. The system also provides opportunities for interaction to resume escorting service if disrupted.

19 Claims, 9 Drawing Sheets

(51) Int. Cl.

| | |
|---|---|
| ***G06T 7/50*** | (2017.01) |
| ***G06V 10/25*** | (2022.01) |
| ***G06V 10/74*** | (2022.01) |
| ***G06V 40/10*** | (2022.01) |
| ***G06V 40/20*** | (2022.01) |
| ***G10L 13/027*** | (2013.01) |
| ***G10L 15/16*** | (2006.01) |
| ***G10L 15/18*** | (2013.01) |
| ***G10L 15/22*** | (2006.01) |
| *G05D 101/15* | (2024.01) |
| *G05D 105/30* | (2024.01) |

(52) U.S. Cl.

CPC ............ *G06V 10/761* (2022.01); *G06V 40/10* (2022.01); *G06V 40/20* (2022.01); *G10L 13/027* (2013.01); *G10L 15/16* (2013.01); *G10L 15/1815* (2013.01); *G10L 15/22* (2013.01); *G05D 2101/15* (2024.01); *G05D 2105/315* (2024.01); *G06T 2207/10016* (2013.01); *G06T 2207/30196* (2013.01); *G10L 2015/223* (2013.01)

(56) References Cited

U.S. PATENT DOCUMENTS

| | | | | |
|---|---|---|---|---|
| 2019/0375093 | A1* | 12/2019 | Kim | B64F 1/368 |
| 2020/0164515 | A1* | 5/2020 | Han | G05D 1/0274 |
| 2020/0272155 | A1* | 8/2020 | Lo | G05D 1/0088 |
| 2021/0080926 | A1 | 3/2021 | Rubinson et al. | |
| 2021/0172741 | A1* | 6/2021 | Liu | G01C 21/20 |

OTHER PUBLICATIONS

Koide et al., Monocular person tracking and identification with on-line deep feature selection for person following robots, Nov. 2, 2019, ScienceDirect, pp. 1-11 (Year: 2019).*

Conte et al., "Autonomous Bayesian escorting of a human integrating intention and obstacle avoidance," Journal of Field Robotics (2022).

* cited by examiner

SYSTEM AND METHOD FOR PROVIDING ROBOT-BASED ESCORTING SERVICE

PRIORITY CLAIM

This U.S. patent application claims priority under 35 U.S.C. § 119 to: India Application No. 202421050378, filed on Jul. 1, 2024. The entire contents of the aforementioned application are incorporated herein by reference.

TECHNICAL FIELD

The disclosure herein generally relates to robotic systems, and, more particularly, to a method and a system for providing robot-based escorting service.

BACKGROUND

Recently, there has been a notable surge in the deployment of robot assistants within large indoor spaces, such as airports, malls, departmental store, hospital etc., with escorting people emerging as a prominent application. The escorting robots are particularly used by people with limited mobility, elderly people, and unaccompanied minors who may find it difficult to move from one place to another in large indoor spaces.

The escorting robots primarily rely on navigation-centric approaches, and assume that the escort subject will follow them seamlessly. In particular, the escorting robots just navigates to a destination location without any consideration for the human as it is simply assumes that the person would follow the robot.

However, in crowded environments, individuals taking escort service may face challenges, such as maintaining speed, getting obstructed or distracted, having limited mobility, or needing to stop for some reason. As a result, conventional robotic systems often fail to provide effective escorting services as they lack awareness of human motion dynamics.

SUMMARY

Embodiments of the present disclosure present technological improvements as solutions to one or more of the above-mentioned technical problems recognized by the inventors in conventional systems. For example, in one aspect, there is provided a processor implemented method for providing robot-based escorting service. The method comprises receiving, by a system via one or more hardware processors, a human audio input, wherein the human audio input is received from a user interested in availing an escort service via a robot, and wherein the human audio input comprises one or more speech based user instructions; converting, by the robotic escort system via the one or more hardware processors, the human audio input into a text using a neural network based automatic speech recognition technique, wherein the neural network based automatic speech recognition technique enables the robot to comprehend the one or more speech based user instructions included in the human audio input by transcribing them into the text; extracting, by the robotic escort system via the one or more hardware processors, a context and a semantic of the text using a primary neural network based natural language processing engine, wherein the primary neural network based natural language processing engine uses the extracted context and semantic of the text to determine an intent of the user, and wherein the intent is one of a user query, a navigation instruction, an escorting command, and a stop command; upon determining that the intent is the escorting command, identifying, by the robotic escort system via the one or more hardware processors, a final destination in the escorting command based on the context and the semantic of the converted text using a secondary neural network based natural language processing engine; determining, by the robotic escort system via the one or more hardware processors, a path to be followed by the robot to reach the final destination, wherein a route information present in a knowledge base is accessed to determine the path; instructing, by the robotic escort system via the one or more hardware processors, the robot to initiate an escort service to the final destination, wherein a robot state is changed to an escorting state from an escort initiation state, upon receiving the instruction, and wherein the robot notifies the user to follow the robot to reach the final destination; upon determining that the robot has started the escort service, performing, by the robotic escort system via the one or more hardware processors, a human movement tracking using a neural network based human motion tracking technique for predicting a user state among one or more predefined user states, wherein the one or more predefined user states comprises a following state, a lagging state, and a stopping state, and wherein the neural network based human motion tracking technique uses a user reference image captured by a camera present in the robot before initiating the escort service to predict the human state; predicting, by the robotic escort system via the one or more hardware processors, a new velocity for the robot based, at least in part, on a current velocity of the robot and the predicted user state using a neural network-based velocity prediction mechanism, upon determining that the predicted user state is one of the lagging state and the stopping state; and adjusting, by the robotic escort system via the one or more hardware processors, the current velocity of the robot based on the predicted new velocity, wherein the velocity adjustment of the robot enables the robot to match speed of the user.

In an embodiment, the method comprises: generating, by the robotic escort system via the one or more hardware processors, a primary text response for the user to inform the user about the change in the current velocity of the robot using a neural network-based response generator; converting, by the robotic escort system via the one or more hardware processors, the primary text response to a primary speech response using a neural network-based text to speech conversion technique; and enabling, by the robotic escort system via the one or more hardware processors, the robot to convey the primary speech response to the user.

In an embodiment, the method comprises: determining, by the robotic escort system via the one or more hardware processors, whether the robot has reached the final destination, wherein the determination is made based on a physical movement tracking of the robot, and wherein the physical movement tracking is performed by a navigation module; generating, by the robotic escort system via the one or more hardware processors, a secondary text response for the user to inform the user about successful completion of the escorting service using the neural network-based response generator, upon determining that the robot has reached the final destination; converting, by the robotic escort system via the one or more hardware processors, the secondary text response to a secondary speech response using the neural network-based text to speech conversion technique; enabling, by the robotic escort system via the one or more hardware processors, the robot to convey the secondary speech response to the user; and instructing, by the robotic escort system via the one or more hardware processors, the robot to change the robot state to the escort ready state.

In an embodiment, the method comprises: setting, by the robotic escort system via the one or more hardware processors, the current velocity of the robot to zero upon determining that the intent is the stop command.

In an embodiment, the step of identifying the final destination in the escorting command based on the context and the semantic of the converted text using the secondary neural network based natural language processing engine comprises: identifying, by the robotic escort system via the one or more hardware processors, a destination in the escorting command using the secondary neural network based natural language processing engine; checking, by the robotic escort system via the one or more hardware processors, whether the identified destination is present in a predefined list of known locations, wherein the predefined list of known locations is accessed from the knowledge base; finalizing, by the robotic escort system via the one or more hardware processors, the identified destination as the final destination upon determining that the identified destination is present in the predefined list of known locations; and instructing, by the robotic escort system via the one or more hardware processors, the robot to change the robot state from an escort ready state to the escort initiation state.

In an embodiment, the step of performing the human motion tracking using the neural network based human motion tracking technique comprises: instructing, by the robotic escort system via the one or more hardware processors, the robot to capture a video stream of the user, the video stream comprising a plurality of video frames; extracting, by the robotic escort system via the one or more hardware processors, one or more vision transformer (ViT) based backbone embeddings from the user reference image; comparing, by the robotic escort system via the one or more hardware processors, the one or more ViT based backbone embeddings with each human of one or more humans detected in each video frame of the plurality of video frames present in the video stream, wherein a cosine similarity matching is performed for comparison; determining, by the robotic escort system via the one or more hardware processors, whether a cosine similarity score of any human is within a predefined threshold in a video frame; upon determining that the cosine similarity score of a human is within the predefined threshold, identifying, by the robotic escort system via the one or more hardware processors, the respective human as the user in the respective video frame of the plurality of video frames; verifying, by the robotic escort system via the one or more hardware processors, the user is present in each video frame of the plurality of video frames based on the cosine similarity score and a predefined differentiating confidence threshold, wherein the verification is performed to ensure that the user is not replaced by another individual in crowded environments, and wherein the user is assumed to be present in a video frame if the cosine similarity score is within the predefined differentiating confidence threshold; establishing, by the robotic escort system via the one or more hardware processors, a bounding box over the user each video frame of the plurality of video frames; stacking, by the robotic escort system via the one or more hardware processors, a first predefined number of video frames of the plurality of video frames to analyze behavior of the user, wherein the behavior of the user is analyzed by constantly re-identifying the user in each video frame of the stacked video frames; upon re-identifying the user in each video frame of the stacked video frames, recalculating, by the robotic escort system via the one or more hardware processors, a relative distance between the robot and the user in each frame of the stacked video frames, wherein a distance between the camera mounted on the robot and the user is used to calculate the relative distance in each frame; determining, by the robotic escort system via the one or more hardware processors, whether the relative distance is uniform or increasing at a lower rate or increasing at higher rate between each frame of the stacked video frames; and detecting, by the robotic escort system via the one or more hardware processors, the user state based on the determination, wherein the user state is considered as the following state if the relative distance is determined to be uniform, wherein the user state is considered as the lagging state if the relative distance is determined to be increasing at the lower rate, and wherein the user state is considered as the stopping state if the relative distance is determined to be increasing at the lower rate.

In an embodiment, the method comprises: upon determining that the user is not re-identified in each video frame of the first predefined number of video frames, instructing, by the robotic escort system via the one or more hardware processors, the robot to halt the escort service; and changing, by the robotic escort system via the one or more hardware processors, the robot state from the escorting state to an escort halted state.

In an embodiment, the method comprises: stacking, by the robotic escort system via the one or more hardware processors, a second predefined number of video frames of the plurality of video frames to analyze behavior of the user, wherein the second predefined number of video frames are different from the first predefined number of video frames; upon re-identifying the user in each video frame of the second predefined number of video frames, instructing by the robotic escort system via the one or more hardware processors, the robot to start the escort service; and changing, by the robotic escort system via the one or more hardware processors, the robot state from the escort halted state to the escorting state.

In an embodiment, the method comprises: upon determining that the user is not re-identified in each video frame of the second predefined number of video frames, instructing, by the robotic escort system via the one or more hardware processors, the robot to abort the escort service; and changing, by the robotic escort system via the one or more hardware processors, the robot state from the escort halted state to an escorting ready state.

In another aspect, there is provided a system for providing robot-based escorting service. The system comprises a memory storing instructions; one or more communication interfaces; and one or more hardware processors coupled to the memory via the one or more communication interfaces, wherein the one or more hardware processors are configured by the instructions to: receive a human audio input, wherein the human audio input is received from a user interested in availing an escort service via a robot, and wherein the human audio input comprises one or more speech based user instructions; convert the human audio input into a text using a neural network based automatic speech recognition technique, wherein the neural network based automatic speech recognition technique enables the robot to comprehend the one or more speech based user instructions included in the human audio input by transcribing them into the text; extract a context and a semantic of the text using a primary neural network based natural language processing engine, wherein the primary neural network based natural language processing engine uses the extracted context and semantic of the text to determine an intent of the user, and wherein the intent is one of a user query, a navigation instruction, an escorting command, and a stop command; upon determining that the intent is the escorting command, identify a final destination in the escorting command based on the context and the semantic of the converted text using a secondary neural network based natural language processing engine; determine a path to be followed by the robot to reach the final destination, wherein a route information present in a knowledge base is accessed to determine the path; instruct the robot to initiate an escort service to the final destination, wherein a robot state is changed to an escorting state from an escort initiation state, upon receiving the instruction, and wherein the robot notifies the user to follow the robot to reach the final destination; upon determining that the robot has started the escort service, perform a human movement tracking using a neural network based human motion tracking technique for predicting a user state among one or more predefined user states, wherein the one or more predefined user states comprises a following state, a lagging state, and a stopping state, and wherein the neural network based human motion tracking technique uses a user reference image captured by a camera present in the robot before initiating the escort service to predict the human state; predict a new velocity for the robot based, at least in part, on a current velocity of the robot and the predicted user state using a neural network-based velocity prediction mechanism, upon determining that the predicted user state is one of the lagging state and the stopping state; and adjust the current velocity of the robot based on the predicted new velocity, wherein the velocity adjustment of the robot enables the robot to match speed of the user.

In yet another aspect, there are provided one or more non-transitory machine-readable information storage mediums comprising one or more instructions which when executed by one or more hardware processors provide robot-based escorting service by receiving, by a system, a human audio input, wherein the human audio input is received from a user interested in availing an escort service via a robot, wherein the human audio input comprises one or more speech based user instructions; converting, by the robotic escort system, the human audio input into a text using a neural network based automatic speech recognition technique, wherein the neural network based automatic speech recognition technique enables the robot to comprehend the one or more speech based user instructions included in the human audio input by transcribing them into the text; extracting, by the robotic escort system, a context and a semantic of the text using a primary neural network based natural language processing engine, wherein the primary neural network based natural language processing engine uses the extracted context and semantic of the text to determine an intent of the user, and wherein the intent is one of a user query, a navigation instruction, an escorting command, and a stop command; upon determining that the intent is the escorting command, identifying, by the robotic escort system, a final destination in the escorting command based on the context and the semantic of the converted text using a secondary neural network based natural language processing engine; determining, by the robotic escort system, a path to be followed by the robot to reach the final destination, wherein a route information present in a knowledge base is accessed to determine the path; instructing, by the robotic escort system, the robot to initiate an escort service to the final destination, wherein a robot state is changed to an escorting state from an escort initiation state, upon receiving the instruction, and wherein the robot notifies the user to follow the robot to reach the final destination; upon determining that the robot has started the escort service, performing, by the robotic escort system, a human movement tracking using a neural network based human motion tracking technique for predicting a user state among one or more predefined user states, wherein the one or more predefined user states comprises a following state, a lagging state, and a stopping state, and wherein the neural network based human motion tracking technique uses a user reference image captured by a camera present in the robot before initiating the escort service to predict the human state; predicting, by the robotic escort system, a new velocity for the robot based, at least in part, on a current velocity of the robot and the predicted user state using a neural network-based velocity prediction mechanism, upon determining that the predicted user state is one of the lagging state and the stopping state; and adjusting, by the robotic escort system, the current velocity of the robot based on the predicted new velocity, wherein the velocity adjustment of the robot enables the robot to match speed of the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
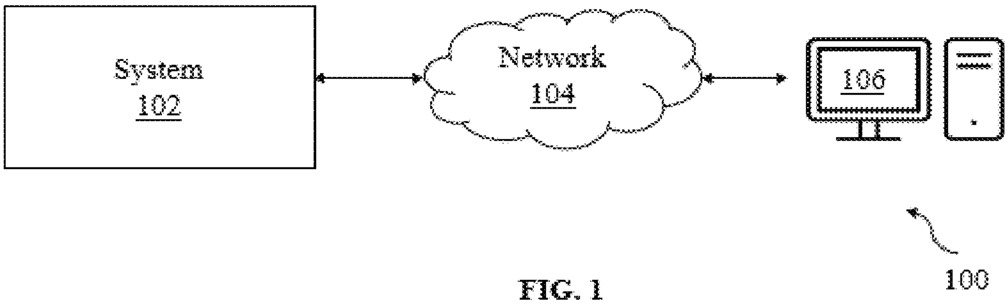
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Travelling through an airport can present challenges for some individuals compared to others. In case of a time crunch, it may rile up the anxiety level. In such a scenario, if someone can escort you to the destination (e.g., boarding gate), it may not only de-stress the travel experience, but also avoid delays in flight departure. Nowadays, these types of services are generally delegated to robots. However, the question remains how to mold a mobile robot into a functional escort service provider in real-life scenarios as existing escort robots provide service completely disregarding a user intent and real life movement dynamics, i.e., they navigate to the destination assuming a cooperative user will follow them.

But, in many cases, the user finds it challenging to keep up due to mobility limitation, crowded environment, or other distractions. Hence, user-aware navigation by the robot is essential to provide an effective and efficient user experience. In other words, the robot should have the ability to monitor the movement of the user/escortee and implement this ability to adjust its motion in an adaptable way while navigating to the desired destination.

Few existing techniques that are available for providing robot based escort service assume a single human environment. However, in cases of large indoor spaces, such as airports, shopping malls etc., where a large amount of public is always present, these techniques may not work effectively. Additionally, most of the techniques works on an assumption of fully cooperative humans within a particular threshold range of the robot which may not work in case of people with special needs due to lack of awareness around human motion dynamics.

So, a technique that can provide escortee aware navigation via the robot i.e., the robot possess the ability to monitor the movement of the escortee and can adjust its motion in an adaptable way while navigating to the desired destination is still to be explored.

Embodiments of the present disclosure overcome the above-mentioned disadvantages by providing a system and a method for providing robot-based escorting service. In particular, the system dynamically tracks the user by predicting their movements (following, lagging, or stopping) at intervals. The system integrates a human re-identification module and state prediction modules for effective performance in crowded spaces and dynamic adaptation. The system also enables the robot to adapt its speed according to the user's movements and provides opportunities for interaction to resume the escorting service if disrupted.

The system of the present disclosure first receives human audio input from a user interested in availing an escort service via a robot. The system then convert the human audio input into a text using a neural network based automatic speech recognition technique. Thereafter, the system extracts context and a semantic of the text using a primary neural network based natural language processing engine which is then further utilized to determine an intent of the user. Further, upon determining that the intent is the escorting command, the system identifies a final destination in the escorting command and determines a path to be followed by the robot to reach the final destination.

The system then instructs the robot to initiate an escort service to the final destination. The system also performs human movement tracking using a neural network based human motion tracking technique for predicting a user state while the robot is providing the escort service. Upon determining that the predicted user state is either a lagging state or a stopping state, the system predicts a new velocity for the robot based on a current velocity of the robot and the predicted user state using a neural network-based velocity prediction mechanism.

Thereafter, the system adjusts the current velocity of the robot based on the predicted new velocity so that the robot can match speed of the user which further helps in providing a seamless experience to the user.

In the present disclosure, the system uses the data captured by a robot to perform human tracking and motion prediction in real-time, thereby eliminating dependency on other wearables, depth data or sensors, which further improves the computation speed and performance of the system. Further, the system enables the robot to be aware and adapt to the user's motion pattern and also provides opportunities for interaction with the user to resume the escorting service if disrupted, thereby enhancing the overall escort service experience for the user in complex, real-world scenarios.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, extraction of a context and a semantic of a text, determination of a path to be followed to reach user requested destination, prediction of a user state by performing human movement tracking etc. The environment 100 generally includes a system 102, a robot 106 (also refereed as robot assistant 106) each coupled to, and in communication with (and/or with access to) a network 104. The environment 100 also includes a user 106 who is interested in availing an escort service via the robot 106. It should be noted that one robot is shown for explanation purpose, there can be multiple robots.

In an embodiment, the robot 106 is deployed in a large indoor space for providing escort services to individuals who are finding it difficult to navigate through the large indoor space.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The robot 106 is a machine that is programmable by a computer and is capable of carrying out a complex series of actions automatically.

The system 102 includes one or more hardware processors and a memory. The system 102 is first configured to receive human audio input from a user (e.g., the user 108) interested in availing an escort service via the robot 106 using the network 104. The system 102 then converts the human audio input into a text using a neural network based automatic speech recognition technique. Thereafter, the system 102 extracts a context and a semantic of the text using a primary neural network based natural language processing engine which is then further utilized to determine an intent of the user 108 among a plurality of pre-defined intents, such as a user query, a navigation instruction, an escorting command, and a stop command.

Thereafter, upon determining that the intent is the escorting command, the system 102 identifies a final destination in the escorting command and determines a path to be followed by the robot to reach the final destination. The system 102 then instructs the robot 106 to initiate an escort service to the final destination. The system 102 also performs human movement tracking using a neural network based human motion tracking technique for predicting a user state while the robot 106 provides the escort service.

Further, upon determining that the predicted user state is either a lagging state or a stopping state, the system 102 predicts a new velocity for the robot 106 based on a current velocity of the robot 106 and the predicted user state using a neural network-based velocity prediction mechanism.

Finally, the system 102 adjusts the current velocity of the robot 106 based on the predicted new velocity so that the robot 106 can match speed of the user 108 which further helps in providing a seamless experience to the user 108.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more devices shown in FIG. 1 may be implemented within a single device, or a single device shown in FIG. 1 may be implemented as multiple, distributed systems or devices. Additionally, or alternatively, a set of devices (e.g., one or more devices) of the environment 100 may perform one or more functions described as being performed by another set of systems or another set of devices of the environment 100 (e.g., refer scenarios described above).

Figure 2:
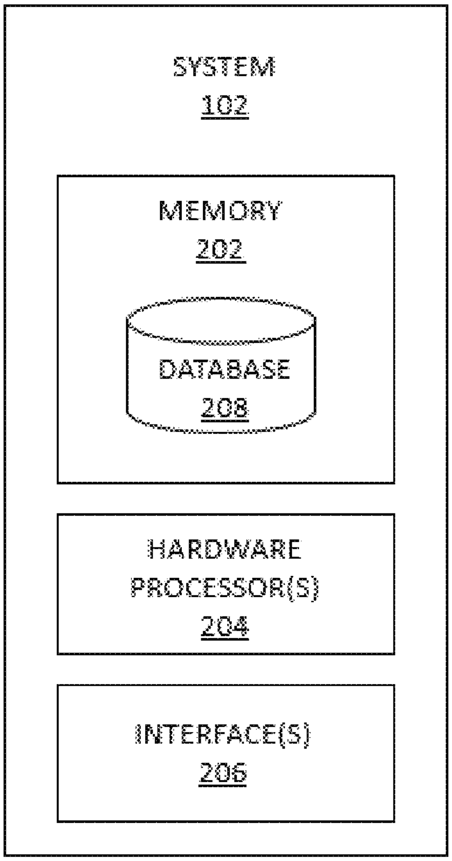
FIG. 2 illustrates an exemplary block diagram of a system for providing robot-based escorting service, in accordance with an embodiment of the present disclosure.

FIG. 2 illustrates an exemplary block diagram of a robotic escort system 102 for providing robot-based escorting service, in accordance with an embodiment of the present disclosure. In some embodiments, the robotic escort system 102 (herein after also referred as the system 102) is embodied as a cloud-based and/or software as a service (SaaS) based architecture. In some embodiments, the robotic escort system 102 may be implemented in a server system. In some embodiments, the robotic escort system 102 may be implemented in a variety of computing systems, such as laptop computers, notebooks, hand-held devices, workstations, mainframe computers, servers, a network cloud and the like.

In an embodiment, the system 102 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like. Examples of the processor 204 include, but are not limited to, an application-specific integrated circuit (ASIC) processor, a reduced instruction set computing (RISC) processor, a complex instruction set computing (CISC) processor, a field-programmable gate array (FPGA), and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, a knowledge base that comprises a predefined list of known locations, intents, predefined user states, one or more processes and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 102 as illustrated and hereinafter described is merely illustrative of an apparatus that could benefit from embodiments of the present disclosure and, therefore, should not be taken to limit the scope of the present disclosure. It is noted that the system 102 may include fewer or more components than those depicted in FIG. 2.

Figure 3:
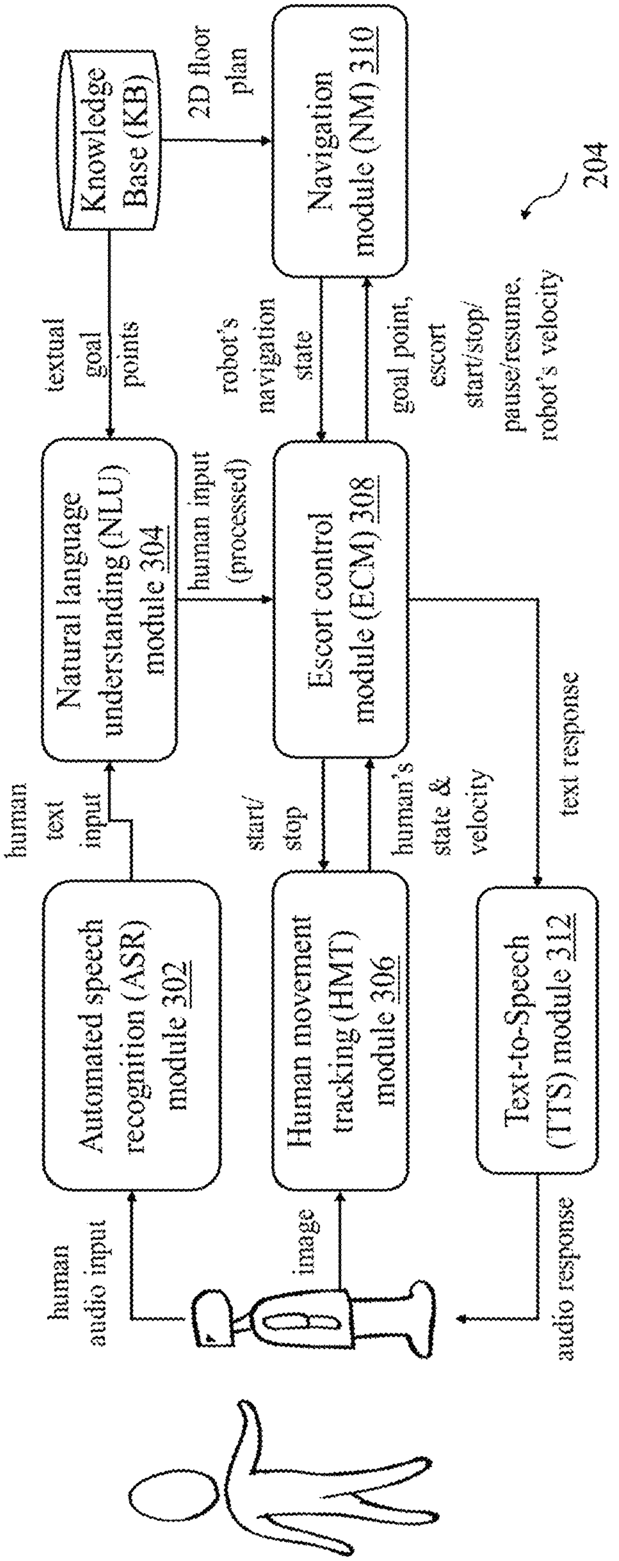
FIG. 3 illustrates a block diagram of a processor of one or more processors used in the system of FIGS. 1 and 2 for providing the robot-based escorting service, in accordance with an embodiment of the present disclosure.

FIG. 3 illustrates a block diagram of a processor 300 of the one or more processors 204 used in the system 102 for providing the robot-based escorting service, in accordance with an embodiment of the present disclosure.

As seen in FIG. 3, the processor 300 includes an automatic speech recognition (ASR) module 302, a natural language understanding (NLU) module 304, a human motion tracking (HMT) module 306, an escort control module (ECM) 308, a navigation module (NM) 310, and a text to speech (TTS) module 312.

The ASR module 302 includes suitable logic and/or interfaces for enabling a robot, such as the robot 106 to comprehend speech based user instructions by transcribing them into text. In particular, the ASR module 302, upon receiving the human audio input from a user, such as the user 108, uses a neural network based automatic speech recognition technique to convert one or more speech based user instructions present in the human audio input into the text. It should be noted that any available speech recognition technique can be used for converting the speech-based user instructions into the text.

The NLU module 304 is in communication with the ASR module 302. The NLU module 304 is configured to first extract context and semantic of the text received from the ASR module 302 using a primary neural network based natural language processing engine. In particular, the primary neural network based natural language processing engine first identifies one or more keywords that are present in the text and then uses the extracted context and semantic of the text to determine an intent of the user. The intent is one of a user query, a navigation instruction, an escorting command, and a stop command. For instance, the user instruction is 'Take me to the VIP lounge', the primary neural network based natural language processing engine present in the NLU module 304 may identify the intent as 'an escorting command' from the keyword 'take me' that is present in the user instruction.

Once it is determined that the intent is the escorting command, the NLU module 304 uses a secondary neural network based natural language processing engine to identify a destination present in the escorting command based on the context and the semantic of the converted text. In particular, the secondary neural network based natural language processing engine performs goal grounding by identifying keywords, such as 'VIP lounge' present in the text i.e. the user instruction 'Take me to the VIP lounge'. The destination data i.e., the identified destination is then utilized for successful escorting.

The HMT module 306 includes suitable logic and/or interfaces for performing Human Movement Tracking (HMT). In an embodiment, the HMT module 306 includes two sub modules viz a human navigation state predictor and a person re-identification module. The person re-identification module is configured to continuously verify that a subject person, i.e. the user 108, remains in video frames captured by a camera installed on the robot 106 and is not replaced by another individual in crowded environments. The human navigation state predictor is configured to analyze embeddings of a flagged person from a sequence of video frames to classify the user's state as "following," "lagging," or "stopping".

In an embodiment, when the user 108 approaches the robot 106, a user reference image is captured by the camera present in the robot to keep track of the correct individual in a crowd. Thereafter, once the user reference image is captured, the camera starts capturing a video stream of the user 108. The system 102 then breaks the video stream into an image sequence on a frame-by-frame basis. The captured video stream and the image sequences are then used provided to the person re-identification module to enable identification of the correct user in the crowded environment.

In at least one example embodiment, the person re-identification module comprises an object detector, a vision transformer (ViT) encoder followed by a neural network, and a transformer-based model for action prediction. The person re-identification module, upon receiving the image sequences/frames, pushes each input image frame into the object detector that provides the person class detections from the image frames and this list of class detections in the form of bounding boxes is pushed into the ViT encoder along with the reference image. Then, inside the ViT encoder, each bounding box in the list of class detections as well as the reference image gets encoded into embedding vectors and reference-vector, respectively. Thereafter, both the embedding vectors and the reference-vector are pushed through a couple of fully connected linear layers with an activation layer between them. Once the embeddings (bounding-box embedding list and reference embedding) pass through the neural network, the resultant embeddings are then compared using a distance function. In an embodiment, a bounding box with the minimum distance value is deemed to be the correct match. Finally, the embedding is fed forward as a resultant embedding, which is then added to a list of positive embeddings. This sequence of positive embedding is then passed onto transformer layers wherein a self-attention mechanism allows the model to weigh the importance of different elements in the sequence of positive embedding when processing each element in the positive embedding. A plurality of self-attention and feed-forward layers present in the neural network analyze and process the input sequences in parallel and compute relationship between long and short range entities within those sequences. A neural network architecture used for performing the human motion tracking is shown with reference to FIG. 7.

In at least one example embodiment, the human navigation state predictor takes person-embeddings with the re-identified bounding box of the correct user as input and stacks them in order to treat them as a sequence. The sequence is then used to determine the user state i.e., whether the user is "following", lagging" or "stopping". The sequence as a stack of set number of frames is pushed through a transformer based network to learn which class of action it belongs to. The added sequential context helps in identifying what the user 108 is doing for a set amount of time during runtime and facilitates the ECM 308 to take actions collaboratively with the navigation stack.

The ECM 308 serves as a central control unit of the robot 106. The ECM 308 interfaces with other modules, such as the NLU module 304, the HMT module 306, the NM 310 and the TTS module 312 to manage the escorting process. In particular, the ECM 308, upon receiving the identified location from the NLU, collaborates with the NM 310 to initiate the escorting service. Additionally, the ECM 308 utilizes output from the HMT module 306 to ensure that the subject user remains within the robot's range. If not, the ECM 308 adjusts the robot's velocity via the NM 310 and initiates Text-to-Speech (TTS) conversion for human interaction.

In at least one example embodiment, the ECM 308 comprises an escort manager, a robot velocity predictor and a response generator (herein after also referred as a neural network-based response generator).

In an embodiment, the escort manager is responsible for managing the escorting process from beginning till end. The functioning of the escort manager is explained in detail with reference to FIG. 4A-4C.

In an embodiment, the robot velocity predictor is configured to predict a new velocity for the robot based on a current velocity of the robot and the predicted user state using a neural network-based velocity prediction mechanism. It should be noted that the robot velocity predictor is enabled when the predicted user state is one of the lagging state and the stopping state. A neural network architecture of the robot velocity predictor is shown with reference to FIG. 8.

In an embodiment, the response generator is basically a neural network-based response generator. The response generator is configured to generate responses, such as a primary text response to inform the user 108 about the change in the current velocity of the robot 106 or a secondary text response to inform the user 108 about successful completion of the escorting service.

The NM 310 is configured to manage physical movement of the robot 106. In an embodiment, the NM 310 includes a navigation global planner and a navigation local planner to determine the most efficient path to the destination. The navigation global planner is first configured to access the knowledge base to get a two-dimensional (2D) floor plan of an outdoor space where the robot 108 is operating. In particular, a route information present in the knowledge base is accessed by the navigation global planner. The navigation global planner then uses the 2D floor plan/route information to determine a path to be followed by the robot 106 to reach the destination. The determined path is then shared with the navigation local planner which manages the physical movement of the robot based on instructions received from the escort manager.

In an embodiment, the knowledge base encompasses knowledge about the large indoor space where the robot is operating, such as an airport or a shopping mall. The knowledge base contains a map of the large indoor space, including its features and potential goal locations, which the NM 310 can access as and when required The TTS module 312 is configured to facilitate user-robot interaction (URI) as needed. In particular, the TTS module 312 converts text responses generated for various scenarios into speech using a neural network-based text to speech conversion technique for enabling communication with the subject user. It should be noted that any available text to speech conversion technique can be used for the same purpose.

Figure 4A:
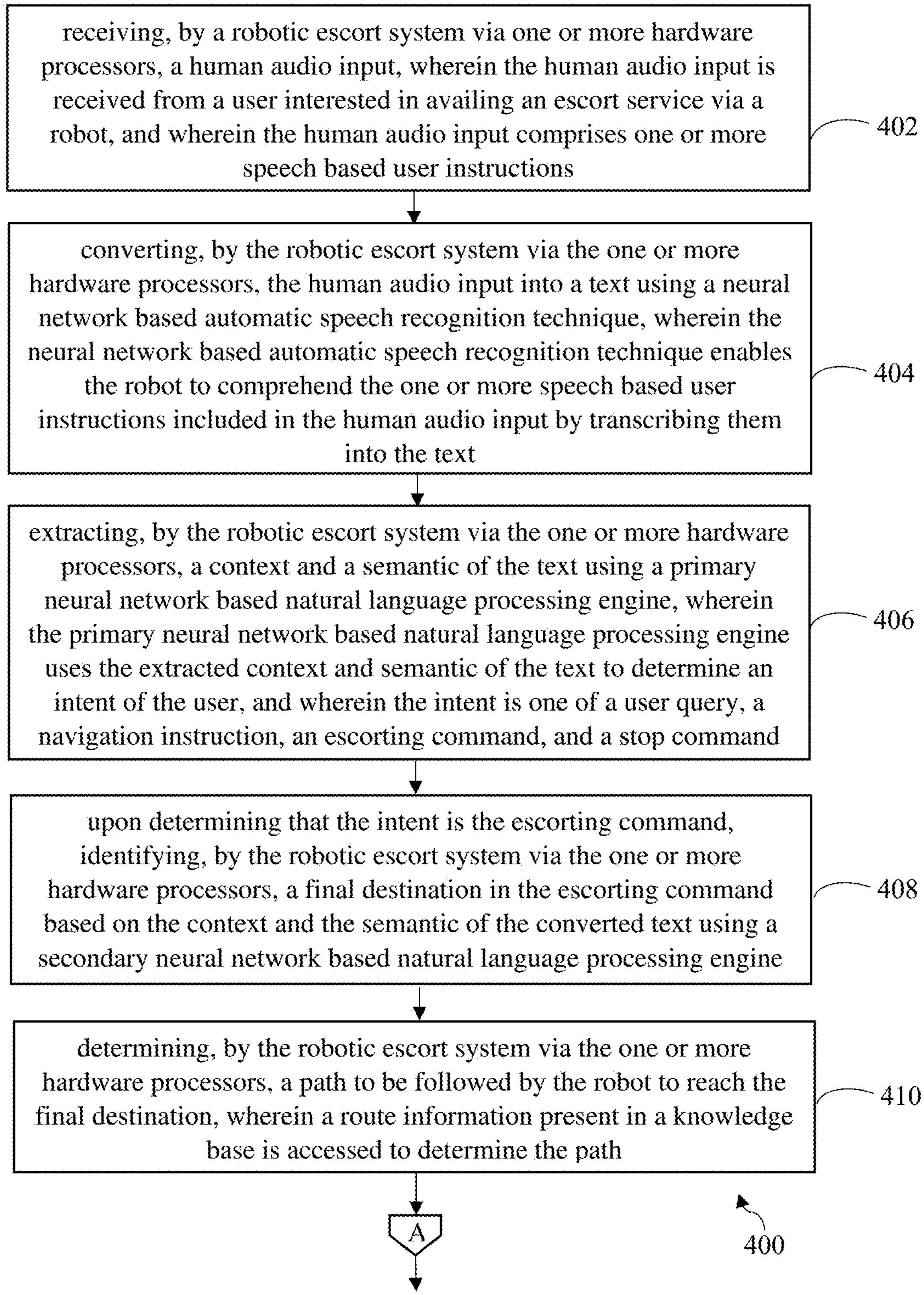
FIGS. 4A, 4B and 4C, collectively, illustrate an exemplary flow diagram of a method for providing robot-based escorting service, in accordance with an embodiment of the present disclosure.
Figure 4B:
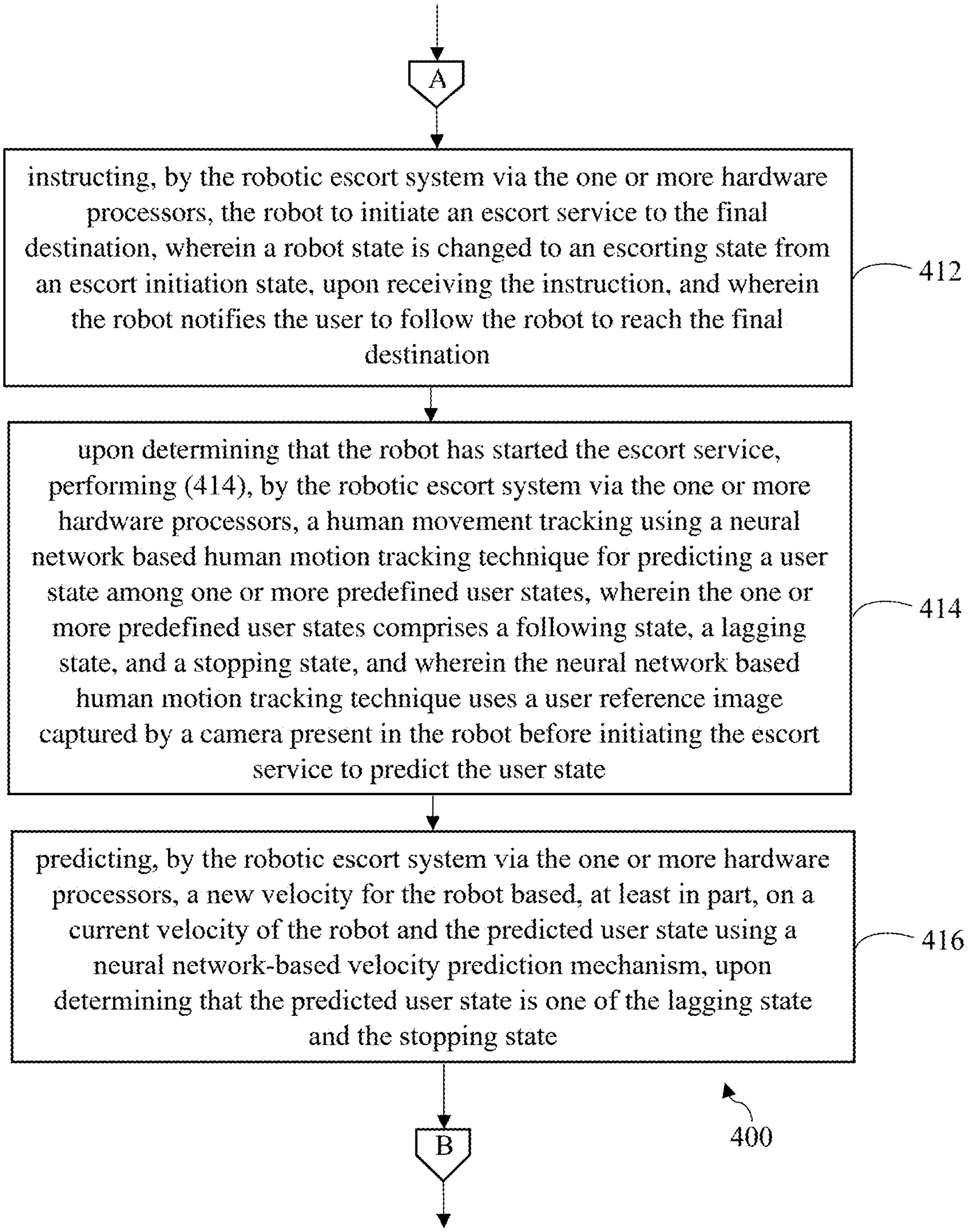
Figure 4C:
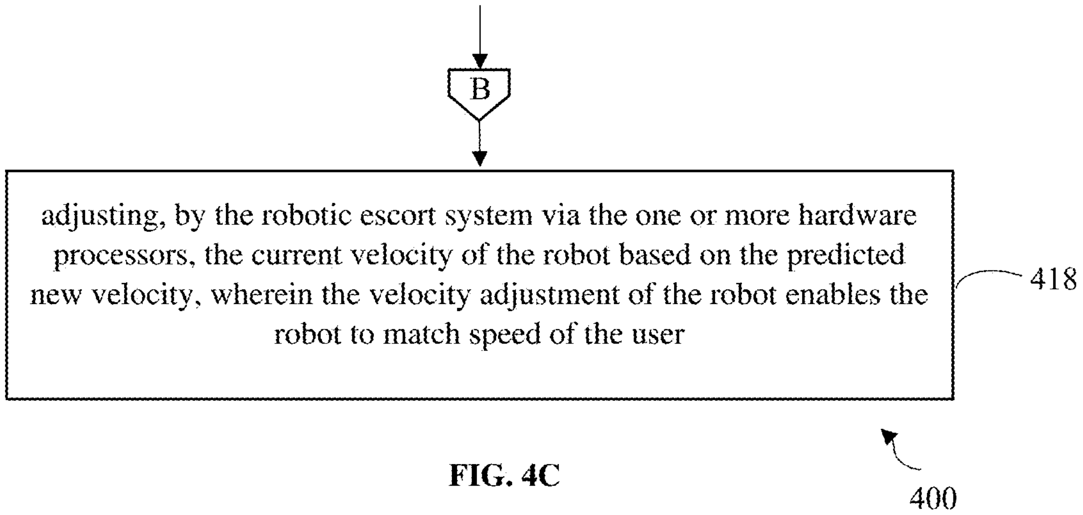

FIGS. 4A, 4B and 4C, collectively, with reference to FIGS. 1 to 3, represent an exemplary flow diagram of a method 400 for providing robot-based escorting service, in accordance with an embodiment of the present disclosure. The method 400 may use the system 102 of FIGS. 1 and 2 for execution. In an embodiment, the system 102 comprises one or more data storage devices or the memory 202 operatively coupled to the one or more hardware processors 204 and is configured to store instructions for execution of steps of the method 400 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 102 as depicted in FIG. 2 and FIG. 1.

At step 402 of the present disclosure, the one or more hardware processors 204 of the system 102 receive a human audio input. The human audio input is received from a user, such as the user 108 interested in availing an escort service via a robot, such as the robot 106. The human audio input includes one or more speech based user instructions. In an embodiment, the robot, after power on or reset or before receiving the human audio input, stays in an 'escort ready' state.

At step 404 of the present disclosure, the one or more hardware processors 204 of the system 102 convert the human audio input into a text using a neural network based automatic speech recognition technique. It should be noted that, without limiting the scope of the invention, any available speech recognition model can be used for the same purpose. The neural network based automatic speech recognition technique enables the robot to comprehend the one or more speech based user instructions included in the human audio input by transcribing them into the text. In particular, the speech based user instructions are converted into text instructions that can be understood by the system 102.

At step 406 of the present disclosure, the one or more hardware processors 204 of the system 102 extract a context and a semantic of the text using a primary neural network based natural language processing engine. It should be noted that, without limiting the scope of the invention, any available natural language processing engine can be used for the same purpose. In an embodiment, the primary neural network based natural language processing engine uses the extracted context and semantic of the text to determine an intent of the user. The intent is one of a user query, a navigation instruction, an escorting command, and a stop command.

At step 408 of the present disclosure, the one or more hardware processors 204 of the system 102 identify a final destination in the escorting command based on the context and the semantic of the converted text using a secondary neural network based natural language processing engine, upon determining that the intent is the escorting command.

In an embodiment, for identifying the final destination, the system 102 first identifies a destination in the escorting command using the secondary neural network based natural language processing engine. With reference to the previous example, in the command 'Take me to the VIP lounge', the secondary neural network based natural language processing engine identifies the destination as a 'VIP lounge'. Thereafter, the system 102 checks whether the identified destination is present in a predefined list of known locations which is accessed from the knowledge base. In particular, whether the destination 'VIP lounge' is present in the outdoor space is determined. Further, if the identified destination is found to be present in the predefined list of known locations, the system 102 finalize the identified destination as the final destination.

In at least one example embodiment, the system 102 instructs the robot to change the robot state from the 'escort ready' state to an 'escort initiation' state in case of the escorting command. Further, in 'escort ready' state, if the robot receives any other input than the escorting command, a suitable response is generated for the user using the response generator.

At step 410 of the present disclosure, the one or more hardware processors 204 of the system 102 determine a path to be followed by the robot to reach the final destination. In an embodiment, the system 102 access a route information present in the knowledge base to determine the best path to reach the final destination. In an embodiment, the system 102 uses the navigation global planner present in the NM 310 for planning the best path. Once the best path is planned, the system informs about the best path to the navigation local planner.

At step 412 of the present disclosure, the one or more hardware processors 204 of the system 102 instruct the robot to initiate an escort service to the final destination. In particular, once the best path is identified, the system 102 informs the robot to start the escort service by instructing the robot to change the robot state from the escort initiation state to an escorting state. The robot notifies the user to follow the robot to reach the final destination.

In an embodiment, the systems also instructs the robot to capture a user reference image by a camera present in the robot before initiating the escort service. Once the user reference image is captured, the system 102 starts the HMT module 306 which uses the captured user reference image for predicting the user state.

At step 414 of the present disclosure, the one or more hardware processors 204 of the system 102 perform a human movement tracking using a neural network based human motion tracking technique for predicting the user state among one or more predefined user states. In an embodiment, the one or more predefined user states comprises a following state, a lagging state, and a stopping state. The neural network based human motion tracking technique uses the user reference image to predict the user state. The above step can be better understood by way of following description.

To perform the human motion tracking, the system 102 first instructs the robot to capture a video stream of the user using the camera installed on the robot. The video stream includes a plurality of video frames. In an embodiment, the video stream is first broken down into an image sequence on a frame-by-frame basis and then passed to the person re-identification module of the HMT module 306. The system 102 then extracts one or more vision transformer (ViT) based backbone embeddings from the user reference image captured initially. The extracted ViT based backbone embeddings are also passed to the person re-identification module.

Thereafter, the person re-identification module of the system 102 compares the one or more ViT based backbone embeddings with each human of one or more humans detected in each video frame of the plurality of video frames present in the video stream. In one embodiment, a cosine similarity matching is performed for comparison. Then, the person re-identification module determines whether a cosine similarity score of any human is within a predefined threshold in a video frame. It should be noted that the predefined threshold is determined based on specific requirements and has been intricately identified through ablation studies conducted during a post-testing phase of the person re-identification module.

Upon determining that the cosine similarity score of a human is within the predefined threshold, the person re-identification module identifies the respective human as the user in the respective video frame of the plurality of video frames. Then, the person re-identification module verifies whether the user is present in each video frame of the plurality of video frames based on the cosine similarity score and a predefined differentiating confidence threshold. It should be noted that the predefined differentiating confidence threshold is determined based on specific requirements and has been intricately identified through ablation studies conducted during a post-testing phase of the person re-identification module. In one embodiment, the user is assumed to be present in a video frame if the cosine similarity score is within the predefined differentiating confidence threshold. It should be noted that the verification is performed to ensure that the user is not replaced by another individual in crowded environments.

Further, the person re-identification module establishes a bounding box over the user in each video frame of the plurality of video frames. The person re-identification module then passes the bounding box established video frame to the human navigation state predictor.

The human navigation state predictor then stacks a first predefined number of video frames of the plurality of video frames to analyze a behavior of the user. In one embodiment, the behavior of the user is analyzed by constantly re-identifying the user in each video frame of the stacked first predefined number of video frames.

Upon re-identifying the user in each video frame of the stacked first predefined number of video frames, the human navigation state predictor recalculates a relative distance between the robot and the user in each frame of the stacked first predefined number of video frames. In one embodiment, a distance between the camera mounted on the robot and the user is used to calculate the relative distance in each frame. Thereafter, the human navigation state predictor determines whether the relative distance is uniform or increasing at a lower rate or increasing at higher rate between each frame of the stacked first predefined number of video frames.

Finally, the human navigation state predictor detects the user state based on the determination. In an embodiment, the user state is considered as the following state if the relative distance is determined to be uniform. The user state is considered as the lagging state if the relative distance is determined to be increasing at the lower rate. And the user state is considered as the stopping state if the relative distance is determined to be increasing at the lower rate.

In case it is determined that the user is not re-identified in each video frame of the first predefined number of video frames, the system 102 instructs the robot to halt the escort service by changing the robot state from the escorting state to an escort halted state.

When the robot is in the escort halted state, the human navigation state predictor stacks a second predefined number of video frames of the plurality of video frames to analyze behavior of the user. It should be noted that the second predefined number of video frames are different from the first predefined number of video frames. The human navigation state predictor the again tries to re-identify the user in each video frame of the second predefined number of video frames.

Upon re-identifying the user in each video frame of the second predefined number of video frames, the system 102 instructs the robot to start the escort service by instructing the robot to change the robot state from the escort halted state to the escorting state. In case it is determined that the user is not re-identified in each video frame of the second predefined number of video frames also, the system 102 instructs the robot to abort the escort service by instructing the robot to change the robot state from the escort halted state to an escorting ready state.

At step 416 of the present disclosure, the one or more hardware processors 204 of the system 102 predict a new velocity for the robot based, at least in part, on a current velocity of the robot and the predicted user state using a neural network-based velocity prediction mechanism, upon determining that the predicted user state is one of the lagging state and the stopping state.

In an embodiment, upon determining that the predicted user state is one of the lagging state and the stopping state, the system 102 enables the robot velocity predictor which takes the current velocity of the robot and the predicted user state as an input to come up with the new velocity for the robot.

At step 418 of the present disclosure, the one or more hardware processors 204 of the system 102 adjust the current velocity of the robot based on the predicted new velocity. In an embodiment, the robot velocity predictor passes the new velocity to the escort manager which performs velocity adjustment to enable the robot to match the speed of the user which further helps in providing a seamless experience to the user.

In at least one example embodiment, in case any modification is done to the current velocity of the robot, the system 102 informs the navigation local planner and the response generator about the same. The navigation local planner may use the information for planning navigation for the robot.

The response generator, upon receiving information about the velocity change, may generate a primary text response for the user to inform the user about the change in the current velocity of the robot using a neural network-based response generator. It should be noted that any response generator can be used for the same purpose. The response generator then passes the primary text response to the TTS module 312 which converts the primary text response to a primary speech response using the neural network-based text to speech conversion technique. The system 102 then enables the robot to convey the primary speech response to the user.

In an embodiment, if the robot's updated velocity is set to zero or '0', then the system 102 instructs the robot to enter the 'escort paused' state from the 'escorting state'. It should be noted that the robot can enter the 'escort paused' upon receiving a pause request from the user. Similarly, the robot can enter again in the 'escorting state' upon receiving a resume request from the user. Further, if the robot stays in the 'escort paused' for a 't' time state, the system 102 informs the robot to abort the escorting process by instructing the robot to change the robot state from the 'escort paused' to 'escort ready' state. In particular, if the escorting is not resumed with 't' time state based on user's input, the system 102 asks the robot to abort the escorting.

In at least one example embodiment, the system 102 set the current velocity of the robot to zero upon determining that the intent is the stop command.

In an embodiment, the system 102 determines whether the robot has reached the final destination. In at least one example embodiment, the NM 310 performs a physical movement tracking of the robot. The system 102 determines whether the robot has reached the final destination based on the physical movement tracking of the robot.

Upon determining that the robot has reached the final destination, the system 102 generates a secondary text response for the user to inform the user about successful completion of the escorting service using the neural network-based response generator. The response generator then passes the secondary text response to the TTS module 312 which converts the secondary text response to a secondary speech response using the neural network-based text to speech conversion technique. The system 102 then enables the robot to convey the secondary speech response to the user. In at least one example embodiment, the system 102 also instructs the robot to change the robot state to the 'escort ready state'.

Figure 5:
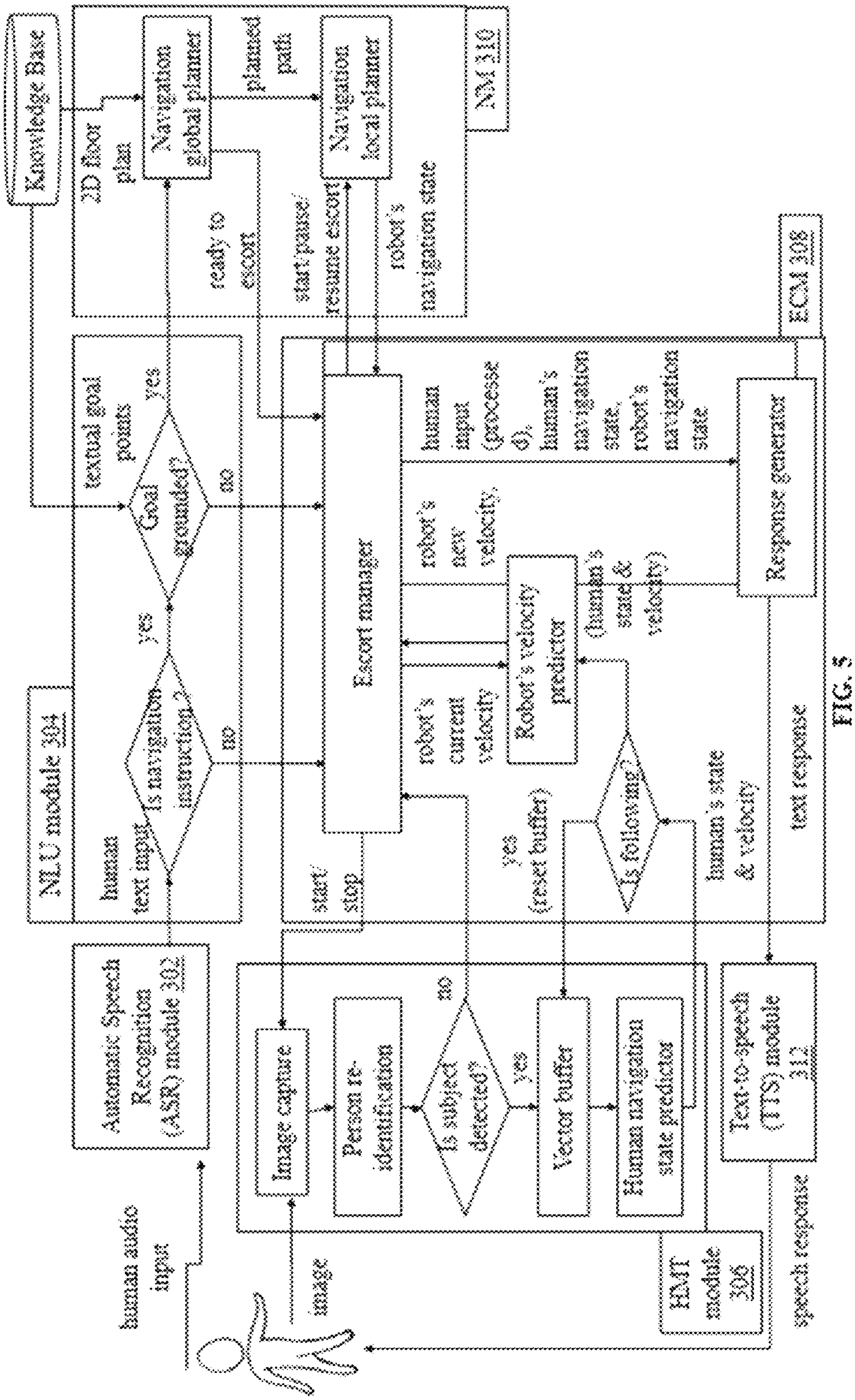
FIG. 5, with reference to FIGS. 1 to 4A-4C, illustrates a schematic block diagram representation of an escorting process performed by the system of FIGS. 1 and 2, in accordance with an embodiment of the present disclosure.

FIG. 5, with reference to FIGS. 1 to 4A-4C, illustrates a schematic block diagram representation of an escorting process performed by the robotic escort system 102, in accordance with an embodiment of the present disclosure.

Figure 6:
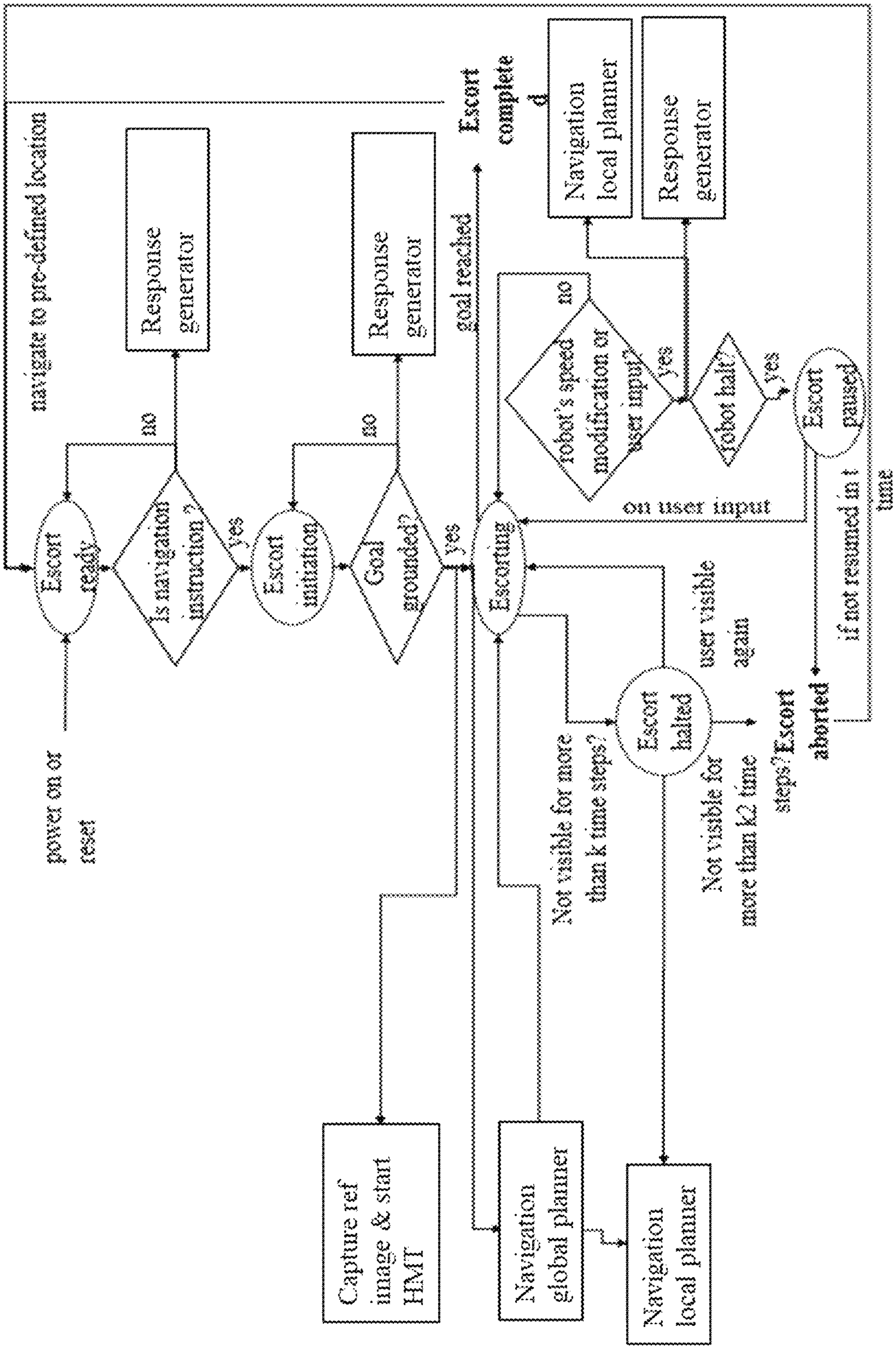
FIG. 6 illustrates a flow diagram explaining functioning of an escort manager along with changes in an escorting state of a robot, in accordance with an embodiment of the present disclosure.
Figure 7:
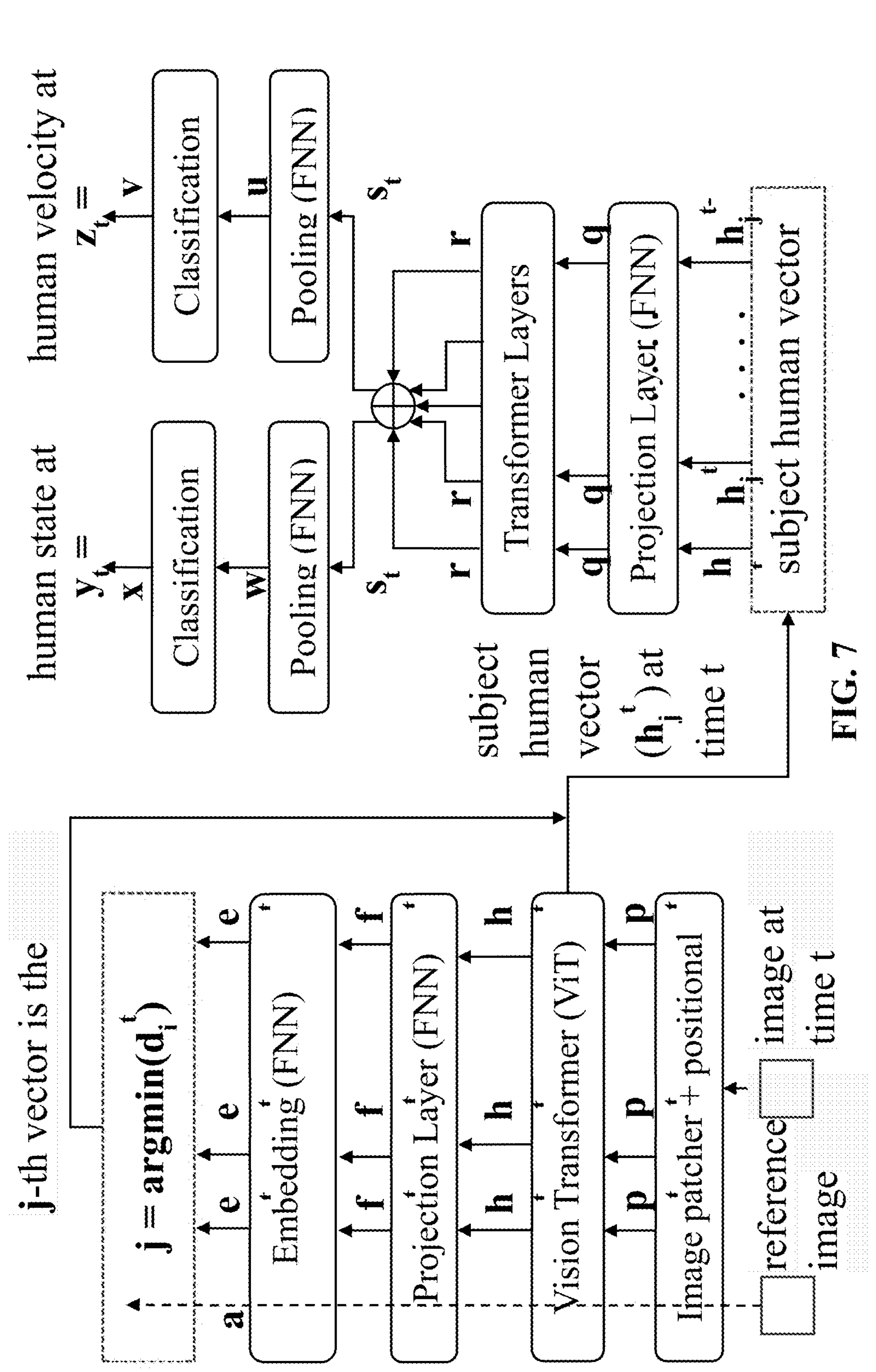
FIG. 7 illustrates a schematic representation of a neural network architecture used for performing a human motion tracking, in accordance with an embodiment of the present disclosure.
Figure 8:
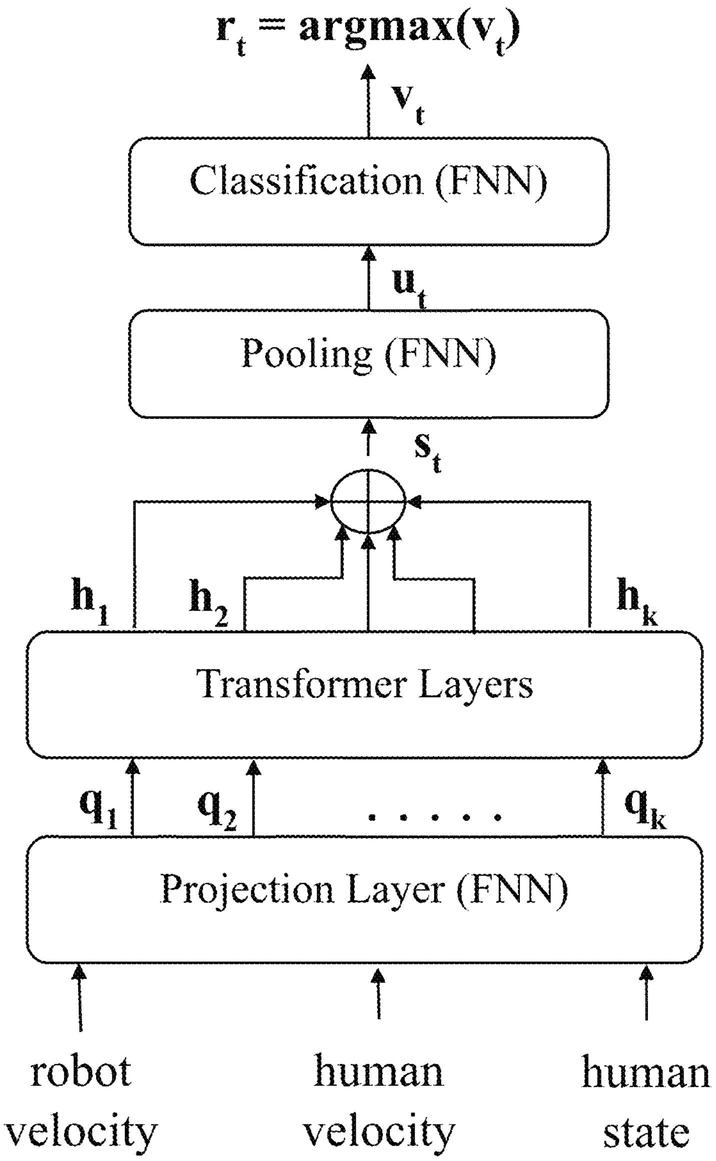
FIG. 8 illustrates a schematic representation of a neural network architecture of a robot velocity predictor, in accordance with an embodiment of the present disclosure.

FIG. 6, with reference to FIGS. 1 to 5, illustrates a flow diagram explaining functioning of the escort manager along with changes in the escorting state of the robot 106, in accordance with an embodiment of the present disclosure.

As seen in FIG. 6, when the robot 106 is switched-on/reset, the robot stays in 'escort ready' state indicating the robot can initiate the escort service upon receiving a request for the same from a user. Once the robot 106 receives the escorting command/navigation instructions, the robot 106 enters 'escort initiation' state.

Then, it is checked whether a destination provided by the user is present or not in an open space where the robot 108 is placed. Upon getting confirmation that the destination exists, a path to reach the destination is determined and goal grounding is performed. Upon successful completion of the goal grounding, the robot 106 enters to an 'escorting' state from the 'escort initiation' state and starts the human movement tracking using the neural network based human motion tracking technique to predict the user state. A suitable response is generated upon unsuccessful completion of the goal grounding.

Thereafter, the robot enters the 'escort halted' state in case the user is not visible during the human motion tracking or based on receiving a user request for the same.

The robot may enters the 'escort paused' state in case the user asks the robot to do so. The complete functioning of the escort manager is explained in detail with reference to FIGS. 3 and 4A-4C, hence not explained herein again for the sake of brevity.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, most of the robot based escorting techniques works on an assumption of fully cooperative humans within a particular threshold range of the robot which may not work in case of people with special needs due to lack of awareness around human motion dynamics. So, to overcome the disadvantages, embodiments of the present disclosure provide a system and a method for providing robot-based escorting service. More specifically, the system uses the data captured by a robot to perform human tracking and motion prediction in real-time, thereby eliminating dependency on other wearables, depth data or sensors, which further improves the computation speed and performance of the system. Further, the system enables the robot to be aware and adapt to the user's motion pattern and also provides opportunities for interaction with the user to resume the escorting service if disrupted, thereby enhancing the overall escort service experience for the user in complex, real-world scenarios.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method (400), comprising:

receiving (402), by a robotic escort system via one or more hardware processors, a human audio input, wherein the human audio input is received from a user interested in availing an escort service via a robot, and wherein the human audio input comprises one or more speech based user instructions;

converting (404), by the robotic escort system via the one or more hardware processors, the human audio input into a text using a neural network based automatic speech recognition technique, wherein the neural network based automatic speech recognition technique enables the robot to comprehend the one or more speech based user instructions included in the human audio input by transcribing them into the text;

extracting (406), by the robotic escort system via the one or more hardware processors, a context and a semantic of the text using a primary neural network based natural language processing engine, wherein the primary neural network based natural language processing engine uses the extracted context and semantic of the text to determine an intent of the user, and wherein the intent is one of a user query, a navigation instruction, an escorting command, and a stop command;

upon determining that the intent is the escorting command, identifying (408), by the robotic escort system via the one or more hardware processors, a final destination in the escorting command based on the context and the semantic of the converted text using a secondary neural network based natural language processing engine;

determining (410), by the robotic escort system via the one or more hardware processors, a path to be followed by the robot to reach the final destination, wherein a route information present in a knowledge base is accessed to determine the path;

instructing (412), by the robotic escort system via the one or more hardware processors, the robot to initiate an escort service to the final destination, wherein a robot state is changed to an escorting state from an escort initiation state, upon receiving the instruction, and wherein the robot notifies the user to follow the robot to reach the final destination;

upon determining that the robot has started the escort service, performing (414), by the robotic escort system via the one or more hardware processors, a human movement tracking using a neural network based human motion tracking technique for predicting a user state among one or more predefined user states, wherein the one or more predefined user states comprises a following state, a lagging state, and a stopping state, and wherein the neural network based human motion tracking technique uses a user reference image captured by a camera present in the robot before initiating the escort service to predict the user state;

predicting (416), by the robotic escort system via the one or more hardware processors, a new velocity for the robot based, at least in part, on a current velocity of the robot and the predicted user state using a neural network-based velocity prediction mechanism, upon determining that the predicted user state is one of the lagging state and the stopping state; and adjusting (418), by the robotic escort system via the one or more hardware processors, the current velocity of the robot based on the predicted new velocity, wherein the velocity adjustment of the robot enables the robot to match speed of the user.

2. The processor implemented method (400) as claimed in claim 1, comprising:

generating, by the robotic escort system via the one or more hardware processors, a primary text response for the user to inform the user about the change in the current velocity of the robot using a neural network-based response generator;

converting, by the robotic escort system via the one or more hardware processors, the primary text response to a primary speech response using a neural network-based text to speech conversion technique; and enabling, by the robotic escort system via the one or more hardware processors, the robot to convey the primary speech response to the user.

3. The processor implemented method (400) as claimed in claim 2, comprising:

determining, by the robotic escort system via the one or more hardware processors, whether the robot has reached the final destination, wherein the determination is made based on a physical movement tracking of the robot, and wherein the physical movement tracking is performed by a navigation module;

generating, by the robotic escort system via the one or more hardware processors, a secondary text response for the user to inform the user about successful completion of the escorting service using the neural network-based response generator, upon determining that the robot has reached the final destination;

converting, by the robotic escort system via the one or more hardware processors, the secondary text response to a secondary speech response using the neural network-based text to speech conversion technique;

enabling, by the robotic escort system via the one or more hardware processors, the robot to convey the secondary speech response to the user; and instructing, by the robotic escort system via the one or more hardware processors, the robot to change the robot state to the escort ready state.

4. The processor implemented method (400) as claimed in claim 1, comprising:

setting, by the robotic escort system via the one or more hardware processors, the current velocity of the robot to zero upon determining that the intent is the stop command.

5. The processor implemented method (400) as claimed in claim 1, wherein the step of identifying the final destination in the escorting command based on the context and the semantic of the converted text using the secondary neural network based natural language processing engine comprises:

identifying, by the robotic escort system via the one or more hardware processors, a destination in the escorting command using the secondary neural network based natural language processing engine;

checking, by the robotic escort system via the one or more hardware processors, whether the identified destination is present in a predefined list of known locations, wherein the predefined list of known locations is accessed from the knowledge base;

finalizing, by the robotic escort system via the one or more hardware processors, the identified destination as the final destination upon determining that the identified destination is present in the predefined list of known locations; and instructing, by the robotic escort system via the one or more hardware processors, the robot to change the robot state from an escort ready state to the escort initiation state.

6. The processor implemented method (400) as claimed in claim 1, wherein the step of performing the human motion tracking using the neural network based human motion tracking technique comprises:

instructing, by the robotic escort system via the one or more hardware processors, the robot to capture a video stream of the user, the video stream comprising a plurality of video frames;

extracting, by the robotic escort system via the one or more hardware processors, one or more vision transformer (ViT) based backbone embeddings from the user reference image;

comparing, by the robotic escort system via the one or more hardware processors, the one or more ViT based backbone embeddings with each human of one or more humans detected in each video frame of the plurality of video frames present in the video stream, wherein a cosine similarity matching is performed for comparison;

determining, by the robotic escort system via the one or more hardware processors, whether a cosine similarity score of any human is within a predefined threshold in a video frame;

upon determining that the cosine similarity score of a human is within the predefined threshold, identifying, by the robotic escort system via the one or more hardware processors, the respective human as the user in the respective video frame of the plurality of video frames;

verifying, by the robotic escort system via the one or more hardware processors, the user is present in each video frame of the plurality of video frames based on the cosine similarity score and a predefined differentiating confidence threshold, wherein the verification is performed to ensure that the user is not replaced by another individual in crowded environments, and wherein the user is assumed to be present in a video frame if the cosine similarity score is within the predefined differentiating confidence threshold;

establishing, by the robotic escort system via the one or more hardware processors, a bounding box over the user in each video frame of the plurality of video frames;

stacking, by the robotic escort system via the one or more hardware processors, a first predefined number of video frames of the plurality of video frames to analyze behavior of the user, wherein the behavior of the user is analyzed by constantly re-identifying the user in each video frame of the stacked video frames;

upon re-identifying the user in each video frame of the stacked video frames, recalculating, by the robotic escort system via the one or more hardware processors, a relative distance between the robot and the user in each frame of the stacked video frames, wherein a distance between the camera mounted on the robot and the user is used to calculate the relative distance in each frame;

determining, by the robotic escort system via the one or more hardware processors, whether the relative distance is uniform or increasing at a lower rate or increasing at higher rate between each frame of the stacked video frames; and detecting, by the robotic escort system via the one or more hardware processors, the user state based on the determination, wherein the user state is considered as the following state if the relative distance is determined to be uniform, wherein the user state is considered as the lagging state if the relative distance is determined to be increasing at the lower rate, and wherein the user state is considered as the stopping state if the relative distance is determined to be increasing at the lower rate.

7. The processor implemented method (400) as claimed in claim 6, comprising:

upon determining that the user is not re-identified in each video frame of the first predefined number of video frames, instructing, by the robotic escort system via the one or more hardware processors, the robot to halt the escort service; and changing, by the robotic escort system via the one or more hardware processors, the robot state from the escorting state to an escort halted state.

8. The processor implemented method (400) as claimed in claim 7, comprising:

stacking, by the robotic escort system via the one or more hardware processors, a second predefined number of video frames of the plurality of video frames to analyze behavior of the user, wherein the second predefined number of video frames are different from the first predefined number of video frames;

upon re-identifying the user in each video frame of the second predefined number of video frames, instructing by the robotic escort system via the one or more hardware processors, the robot to start the escort service; and changing, by the robotic escort system via the one or more hardware processors, the robot state from the escort halted state to the escorting state.

9. The processor implemented method (400) as claimed in claim 7, further comprising:

upon determining that the user is not re-identified in each video frame of the second predefined number of video frames, instructing, by the robotic escort system via the one or more hardware processors, the robot to abort the escort service; and changing, by the robotic escort system via the one or more hardware processors, the robot state from the escort halted state to an escorting ready state.

10. A system (102), comprising:

a memory (202) storing instructions;

one or more communication interfaces (206); and one or more hardware processors (204) coupled to the memory (202) via the one or more communication interfaces (206), wherein the one or more hardware processors (204) are configured by the instructions to:

receive a human audio input, wherein the human audio input is received from a user interested in availing an escort service via a robot, and wherein the human audio input comprises one or more speech based user instructions;

convert the human audio input into a text using a neural network based automatic speech recognition technique, wherein the neural network based automatic speech recognition technique enables the robot to comprehend the one or more speech based user instructions included in the human audio input by transcribing them into the text;

extract a context and a semantic of the text using a primary neural network based natural language processing engine, wherein the primary neural network based natural language processing engine uses the extracted context and semantic of the text to determine an intent of the user, and wherein the intent is one of a user query, a navigation instruction, an escorting command, and a stop command;

upon determining that the intent is the escorting command, identify a final destination in the escorting command based on the context and the semantic of the converted text using a secondary neural network based natural language processing engine;

determine a path to be followed by the robot to reach the final destination, wherein a route information present in a knowledge base is accessed to determine the path;

instruct the robot to initiate an escort service to the final destination, wherein a robot state is changed to an escorting state from an escort initiation state, upon receiving the instruction, and wherein the robot notifies the user to follow the robot to reach the final destination;

upon determining that the robot has started the escort service, perform a human movement tracking using a neural network based human motion tracking technique for predicting a user state among one or more predefined user states, wherein the one or more predefined user states comprises a following state, a lagging state, and a stopping state, and wherein the neural network based human motion tracking technique uses a user reference image captured by a camera present in the robot before initiating the escort service to predict the user state;

predict a new velocity for the robot based, at least in part, on a current velocity of the robot and the predicted user state using a neural network-based velocity prediction mechanism, upon determining that the predicted user state is one of the lagging state and the stopping state; and adjust the current velocity of the robot based on the predicted new velocity, wherein the velocity adjustment of the robot enables the robot to match speed of the user.

11. The system as claimed in claim 10, wherein the one or more hardware processors (204) are configured by the instructions to:

generate a primary text response for the user to inform the user about the change in the current velocity of the robot using a neural network-based response generator;

convert the primary text response to a primary speech response using a neural network-based text to speech conversion technique; and enable the robot to convey the primary speech response to the user.

12. The system as claimed in claim 11, wherein the one or more hardware processors (204) are configured by the instructions to:

determine whether the robot has reached the final destination, wherein the determination is made based on a physical movement tracking of the robot, and wherein the physical movement tracking is performed by a navigation module;

generate a secondary text response for the user to inform the user about successful completion of the escorting service using the neural network-based response generator, upon determining that the robot has reached the final destination;

convert the secondary text response to a secondary speech response using the neural network-based text to speech conversion technique;

enable the robot to convey the secondary speech response to the user; and instruct the robot to change the robot state to the escort ready state.

13. The system as claimed in claim 10, wherein the one or more hardware processors (204) are configured by the instructions to:

set the current velocity of the robot to zero upon determining that the intent is the stop command.

14. The system as claimed in claim 10, wherein for identifying the final destination in the escorting command based on the context and the semantic of the converted text using the secondary neural network based natural language processing engine further, the one or more hardware processors (204) are configured by the instructions to:

identify a destination in the escorting command using the secondary neural network based natural language processing engine;

check whether the identified destination is present in a predefined list of known locations, wherein the predefined list of known locations is accessed from the knowledge base;

finalize the identified destination as the final destination upon determining that the identified destination is present in the predefined list of known locations; and instruct the robot to change the robot state from an escort ready state to the escort initiation state.

15. The system as claimed in claim 10, wherein for performing the human motion tracking using the neural network based human motion tracking technique, the one or more hardware processors (204) are configured by the instructions to:

instruct the robot to capture a video stream of the user, the video stream comprising a plurality of video frames;

extract one or more vision transformer (ViT) based backbone embeddings from the user reference image;

compare the one or more ViT based backbone embeddings with each human of one or more humans detected in each video frame of the plurality of video frames present in the video stream, wherein a cosine similarity matching is performed for comparison;

determine whether a cosine similarity score of any human is within a predefined threshold in a video frame;

upon determining that the cosine similarity score of a human is within the predefined threshold, identify the respective human as the user in the respective video frame of the plurality of video frames;

verify the user is present in each video frame of the plurality of video frames based on the cosine similarity score and a predefined differentiating confidence threshold, wherein the verification is performed to ensure that the user is not replaced by another individual in crowded environments, and wherein the user is assumed to be present in a video frame if the cosine similarity score is within the predefined differentiating confidence threshold;

establish a bounding box over the user in each video frame of the plurality of video frames;

stack a first predefined number of video frames of the plurality of video frames to analyze behavior of the user, wherein the behavior of the user is analyzed by constantly re-identifying the user in each video frame of the stacked video frames;

upon re-identifying the user in each video frame of the stacked video frames, recalculate a relative distance between the robot and the user in each frame of the stacked video frames, wherein a distance between the camera mounted on the robot and the user is used to calculate the relative distance in each frame;

determine whether the relative distance is uniform or increasing at a lower rate or increasing at higher rate between each frame of the stacked video frames; and detect the user state based on the determination, wherein the user state is considered as the following state if the relative distance is determined to be uniform, wherein the user state is considered as the lagging state if the relative distance is determined to be increasing at the lower rate, and wherein the user state is considered as the stopping state if the relative distance is determined to be increasing at the lower rate.

16. The system as claimed in claim 15, wherein the one or more hardware processors (204) are configured by the instructions to:

upon determining that the user is not re-identified in each video frame of the first predefined number of video frames, instruct the robot to halt the escort service; and change the robot state from the escorting state to an escort halted state.

17. The system as claimed in claim 16, wherein the one or more hardware processors (204) are configured by the instructions to:

stack a second predefined number of video frames of the plurality of video frames to analyze behavior of the user, wherein the second predefined number of video frames are different from the first predefined number of video frames;

upon re-identifying the user in each video frame of the second predefined number of video frames, instruct the robot to start the escort service; and change the robot state from the escort halted state to the escorting state.

18. The system as claimed in claim 16, wherein the one or more hardware processors (204) are configured by the instructions to:

upon determining that the user is not re-identified in each video frame of the second predefined number of video frames, instruct the robot to abort the escort service; and change the robot state from the escort halted state to an escorting ready state.

19. One or more non-transitory machine-readable information storage mediums comprising one or more instructions which when executed by one or more hardware processors cause:

receiving a human audio input, wherein the human audio input is received from a user interested in availing an escort service via a robot, and wherein the human audio input comprises one or more speech based user instructions;

converting the human audio input into a text using a neural network based automatic speech recognition technique, wherein the neural network based automatic speech recognition technique enables the robot to comprehend the one or more speech based user instructions included in the human audio input by transcribing them into the text;

extracting a context and a semantic of the text using a primary neural network based natural language processing engine, wherein the primary neural network based natural language processing engine uses the extracted context and semantic of the text to determine an intent of the user, and wherein the intent is one of a user query, a navigation instruction, an escorting command, and a stop command;

upon determining that the intent is the escorting command, identifying a final destination in the escorting command based on the context and the semantic of the converted text using a secondary neural network based natural language processing engine;

determining a path to be followed by the robot to reach the final destination, wherein a route information present in a knowledge base is accessed to determine the path;

instructing the robot to initiate an escort service to the final destination, wherein a robot state is changed to an escorting state from an escort initiation state, upon receiving the instruction, and wherein the robot notifies the user to follow the robot to reach the final destination;

upon determining that the robot has started the escort service, performing a human movement tracking using a neural network based human motion tracking technique for predicting a user state among one or more predefined user states, wherein the one or more predefined user states comprises a following state, a lagging state, and a stopping state, and wherein the neural network based human motion tracking technique uses a user reference image captured by a camera present in the robot before initiating the escort service to predict the user state;

predicting a new velocity for the robot based, at least in part, on a current velocity of the robot and the predicted user state using a neural network-based velocity prediction mechanism, upon determining that the predicted user state is one of the lagging state and the stopping state; and adjusting the current velocity of the robot based on the predicted new velocity, wherein the velocity adjustment of the robot enables the robot to match speed of the user.

* * * * *